July 14, 1942. W. F. F. MARTIN-HURST 2,290,059
VALVE FOR STEAM OR PRESSURE VESSELS
Filed Dec. 18, 1939
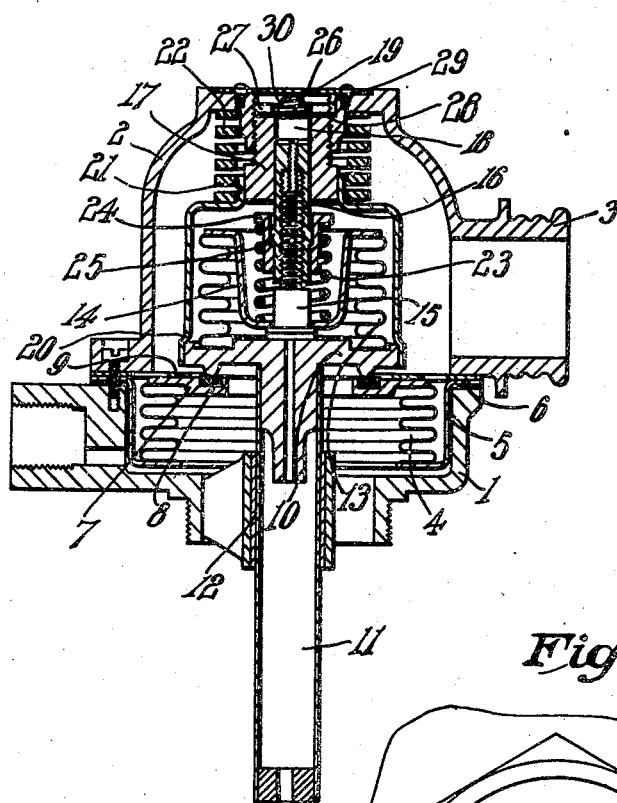
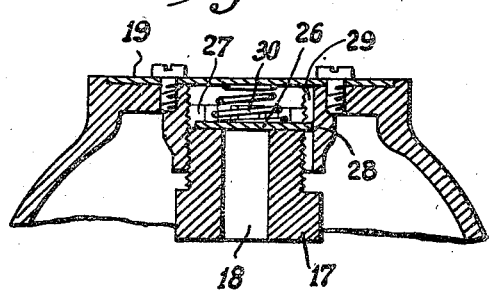
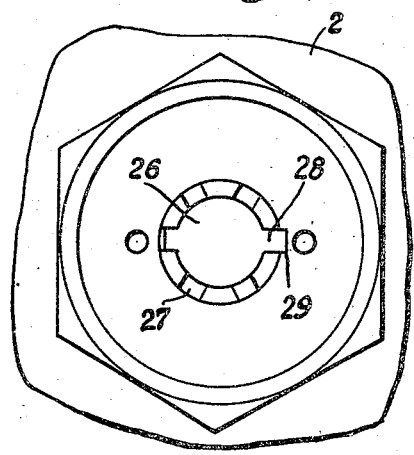
INVENTOR
WILLIAM FREDERICK FORREST MARTIN-HURST
By Norris & Bateman
ATTORNEYS Patented July 14, 1942

2,290,059

UNITED STATES PATENT OFFICE 2,290,059

VALVE FOR STEAM OR PRESSURE VESSELS

William Frederick Forrest Martin-Hurst, Sunbury-on-Thames, England

Application December 18, 1939, Serial No. 309,911
In Great Britain August 8, 1938

5 Claims. (Cl. 236—92)

This invention relates to a valve for use in connection with steam and other pressure vessels containing vaporizable liquid.

The device is especially intended to be used for the protection of liquid cooling systems for aircraft engines and its principal function is to allow air or other incondensible gas to escape from the system when heated without permitting avoidable loss of liquid or vapour. According to one form of the invention, the device also acts as an air inlet valve and as a safety valve, that is to say it admits air to the steam or vapour pipe or vessel during cooling so as to prevent crushing of the vessel by the pressure of the atmosphere and permits vapour to escape when necessary to prevent the development of excessive internal pressure.

According to the invention, a valve adapted to be opened by the fluid pressure in the pipe or other vessel to be protected is controlled by a temperature-sensitive expansible chamber in which pressure tending to close the valve is produced by the evaporation of a liquid contained in the expansible chamber or in a phial communicating therewith and arranged to be heated by the liquid in the vessel to be protected or by the vapour arising therefrom. The liquid contained in the expansible chamber or in the phial may be the same liquid as that used in the vessel to be protected or it may be a liquid having a boiling point slightly above or slightly below that of the liquid used in the vessel to be protected. The pressure tending to close the valve due to the temperature sensitive chamber is thus equal or nearly equal to the vapour pressure in the vessel to be protected whilst the total pressure tending to open the valve comprises the partial pressure of the vapour in the vessel and the partial pressure of any incondensible gas which may be present. The action of the valve thus depends upon the partial pressure due to air or other incondensible gas in the vessel. When the pressure of air or incondensible gas falls below a sufficient value, the valve closes and thus prevents avoidable loss of vapour.

According to one form of the invention, a valve member controlled by a temperature-sensitive expansible chamber as aforesaid is adapted to close against an annular seat which is normally held in a fixed position but is adapted to move away from the valve so as to admit air into the pipe or vessel whenever the external pressure exceeds the pressure inside the pipe or vessel, thus providing for the automatic relief of crushing pressure due to the condensation of fluid within the pipe or vessel to be protected.

The invention will be fully understood from the following description of the construction and operation of a preferred embodiment of the invention taken in conjunction with the accompanying drawing in which similar parts are designated by the same reference characters in the different figures.

Figure 1 is a sectional view of the device; Figure 2 is a detail sectional view of the upper portion of the device on an enlarged scale, certain parts being omitted; and Figure 3 is a top plan view of the portion of the device shown in Figure 2.

In this preferred embodiment, the valve mechanism is contained in a casing having a lower part 1 adapted to be screwed into a filling aperture or other opening in the pipe or vessel to be protected and an upper part 2 having a lateral outlet 3 adapted for connection to a pipe conduit for carrying air or vapour to a suitable point where it may be allowed to escape into the outer atmosphere.

Supported in the lower part of the casing is a flexible metal bellows 4 mounted in a cylindrical sheet metal holder 5 which is formed at its upper end with an outwardly turned flange 6 clamped between the two parts of the casing. The said sheet metal holder is formed at its lower end with an inwardly turned flange to which the lower end of the bellows is fixed. The upper end of the bellows 4 is attached to an annular disc 7 which projects inwards from the bellows and carries an annular valve seat 8 of smaller diameter than the bellows. This valve seat may be made of a heat-resisting synthetic rubber. The expansion of the bellows is limited by means of an annular stop disc 9 which is clamped together with the flange 6 of the aforesaid holder between the two parts of the valve casing.

The upper part of the casing contains a disc valve 10 which is adapted to close against the valve seat 8 and which is attached to a tubular phial 11 projecting downwards through the valve seat and through a tubular guide 12 attached to the lower part of the valve casing.

The phial is charged with a suitable volatile liquid and communicates through an opening in the disc valve with the interior of a flexible metal bellows 13 attached at one end to the disc valve and at the other end to a cup-shaped end plate 14 which projects into the interior of the bellows and carries a central upstanding rod 15. An adjustable tubular extension 16 screwed on this rod is guided in a bush 17 secured in an opening 18 in the top of the valve casing by the engagement of external screw-threads on the bush with internal screw-threads in the opening. The said opening is covered by means of an external plate 19 which is removable to allow a tool to be inserted for setting the aforesaid adjustable extension and for adjusting the aforesaid bush.

The bellows 13 is enclosed in a cage 20 attached at its lower end to the disc valve and formed at its upper end with a tubular projection 21 guided on the bush 17. An air pressure release spring 22 is located between the upper end of this cage and the upper wall of the valve casing so that when the system is cold the disc valve 10 is pressed against its seat by the action of the spring 22. This spring may be set so that a pressure of say 2½ lbs. per square inch is necessary to open the valve.

The expansion of the bellows 13 is limited by contact of the upper flange of end plate 14 with the opposed portion of the cage 20 and is also controlled by a vapour pressure relief spring 23 mounted round the rod 15 and bearing at one end against the bellows end plate 14 and at the other end against a follower 24 supported by an annular projection 25 formed on the part 16.

As previously indicated, the bush 17 and tubular extension 16 can each be adjusted by means of a suitable tool inserted through the opening 18. In order to secure the bush 17 in adjusted position, a key 26 is provided. This key consists of a disc adapted to fit into a recess in the head of the bush 17 and formed with one or more peripheral projections adapted to engage in radial slots 27 formed in the head of the bush. One of the aforesaid projections, indicated in the drawing by the reference numeral 28 projects into a groove 29 formed in the fixed casing part so that the engagement of this projection with the groove 29 holds the key 26 and therefore the bush 17 against rotation. The key 26 is normally held in place by means of a spring 30 compressed between the key 26 and the cover plate 19. When the plate 19 is removed, the spring 30 and key 26 can easily be removed to permit the bush 17 to be adjusted.

In the operation of the valve mechanism, when the system is cold the valve 10 is closed against the seat 8 and the escape of liquid by splashing is thus prevented.

As the system warms up, any air or incondensible gas trapped within the system produces an internal pressure. As soon as this pressure becomes sufficient to overcome the action of the air pressure release spring 22 the disc valve opens and allows the air or other incondensible gas to escape.

The heating up of the system also causes the bellows 13 to expand so that the parts 15, 16 and 25 move bodily upwards until the follower 24 comes against the bush 17. The pressure of the bellows 13 is then added to that of the air pressure release spring 22 tending to close the valve. Since the pressure of the bellows is equal or approximately equal to the partial pressure of the vapour within the system, the valve will now remain open only so long as the partial pressure of air or incondensible gas in the system is sufficient to overcome the action of the air pressure release spring. When the partial pressure of the air or incondensible gas remaining in the system falls below this value, the disc valve closes and thus prevents loss of vapour.

The bellows 13, by its natural springiness, may either oppose or assist the air pressure release spring according to whether the convolutions of the bellows are in compression or in tension when the follower 24 comes against the bush 17. By screwing the bush 17 up or down in the opening 18 in the top of the valve casing this compression or tension of the convolutions of the bellows at the time of contact between the follower 24 and bush 17 can be varied and thus the actual value of the partial pressure of air or incondensible gas necessary to open the valve can be regulated.

The pressure of the vapour pressure release spring 23 is adjusted by screwing the tubular extension 16 up or down on the rod 15 and this adjustment determines the maximum pressure of vapour permitted in the system. Such an adjustment of the follower 24, which is made before the device is put into operation, predetermines the vapor pressure at which the valve 10 will open because it varies the power of the spring 23 which, after it abuts against the bush 17, sustains the total reaction of the bellows 13 tending, under the influence of vapor pressure, to close said valve, and the adjustment of the follower 24 on the rod 15 also varies its range of movement before it comes into contact with the bush 17, and, consequently, varies the extent of expansion and, accordingly, the influence of the bellows 13 itself, acting as a spring, upon the movement of said valve. Therefore, when a predetermined vapour pressure is exceeded, the bellows 13 expands and the vapour pressure release spring yields, allowing the disc valve to open. The device thus functions as a safety valve and prevents the production of dangerous pressure within the system.

During cooling of the system, the condensation of fluid within the system causes a fall of pressure therein with the result that the bellows 4 is compressed and the seat 8 moves away from the disc valve 10. The disc valve is prevented by the annular stop disc 9 from following the movement of the seat 8. The valve is thus opened by the movement of the seat 8 and the formation of a partial vacuum in the system is prevented.

I claim:

1. A valve device for steam or pressure vessels; comprising a casing having an inlet and an outlet and a valve seat therebetween, a movable valve member for controlling flow through said seat, a temperature sensitive exansible chamber in said casing constructed and arranged to tend to close said valve member in response to a rise in temperature against the action of which said valve member can open in response to and to relieve excessive pressure in the inlet, and a movable valve seat cooperable with said valve member but movable independently thereof in response to a drop of the inlet pressure below the outlet pressure to permit flow from the outlet to the inlet.

2. A valve device according to claim 1, including a vapour pressure release spring acting in conjunction with said expansible chamber upon predetermined movement of said expansible chamber to close said valve member but permitting the valve to open when the inlet vapour pressure exceeds a certain limit so that the device functions as a safety valve.

3. A valve device according to claim 1, wherein the valve seat is attached to the valve casing by a flexible bellows device and wherein the valve seat is yieldable inwardly when the outlet pressure exceeds the inlet pressure, and including means for limiting the movements of the valve member and valve seat so that the valve can open by outward movement of the valve member in response to excessive pressure and again the action of said expansible chamber to permit the escape of incondensible air or gas or to relieve excessive vapor pressure and can also open by inward movement of the valve seat when the inlet pressure falls below the outlet pressure, whereby the valve member and its seat serve the three purposes of an air release valve, a safety valve and an air inlet valve.

4. A device according to claim 1 including a cage attached to and movable with the valve member and in which said expansible chamber is located, and an air pressure release spring acting on said cage to urge the valve closed.

5. A valve device for steam or pressure vessels, comprising a valve member arranged to open in response to and to relieve excessive pressure, a movable valve seat cooperating with said valve member, a temperature sensitive expansible bellows arranged to act when expanded to tend to close said valve member, a phial containing a vaporisable liquid communicating with said bellows, a spring opposing expansion of said bellows, a spring opposing opening of said valve member, an expansible metal bellows supporting said valve seat, and a casing having an inlet and an outlet for air and vapor passing between said valve member and seat and enclosing all of said elements and adapted to be mounted as a unit on the vessel to be protected.

WILLIAM FREDERICK
     FORREST MARTIN-HURST.